United States Patent [19]

Melpolder

[11] Patent Number: 5,055,602
[45] Date of Patent: Oct. 8, 1991

[54] POLYMERIZABLE DYE

[75] Inventor: John B. Melpolder, Hilton, N.Y.

[73] Assignee: Bausch & Lomb Incorporated, Rochester, N.Y.

[21] Appl. No.: 504,447

[22] Filed: Apr. 3, 1990

Related U.S. Application Data

[63] Continuation-in-part of Ser. No. 348,543, May 2, 1989.

[51] Int. Cl.$^5$ .................................... C07C 225/34
[52] U.S. Cl. .................................... 552/238; 552/254
[58] Field of Search ............................ 552/238, 254

[56] References Cited

U.S. PATENT DOCUMENTS

| | | | |
|---|---|---|---|
| Re. 27,401 | 6/1972 | Wichterle | 260/2.5 R |
| Re. 31,406 | 10/1983 | Gaylord | 526/279 |
| 3,518,324 | 6/1970 | Polmanteer | 260/825 |
| 3,532,679 | 10/1970 | Steckler | 260/80.72 |
| 3,937,680 | 2/1976 | de Carle | 260/80.72 |
| 3,950,315 | 4/1976 | Cleaver | 351/160 |
| 4,136,250 | 1/1979 | Mueller | 528/29 |
| 4,138,382 | 2/1979 | Polmanteer | 260/29.6 |
| 4,139,548 | 2/1979 | Tanaka | 260/448.2 |
| 4,152,508 | 5/1979 | Ellis | 526/279 |
| 4,153,641 | 5/1979 | Deichert | 260/827 |
| 4,252,421 | 2/1981 | Foley | 351/162 |
| 4,372,203 | 2/1983 | Brass | 101/124 |
| 4,424,328 | 1/1984 | Ellis | 526/279 |
| 4,433,111 | 2/1984 | Tighe et al. | 525/326.2 |
| 4,450,264 | 5/1984 | Cho | 526/279 |
| 4,540,761 | 9/1985 | Kawamura | 526/245 |
| 4,553,975 | 11/1985 | Su | 8/507 |

FOREIGN PATENT DOCUMENTS 1400892   5/1973   United Kingdom .

*Primary Examiner*—Joseph L. Schofer
*Assistant Examiner*—Alex H. Walker
*Attorney, Agent, or Firm*—Craig E. Larson; Christopher E. Blank; Mary Ann Tucker

[57] ABSTRACT

Dye monomers of the general chemical formula

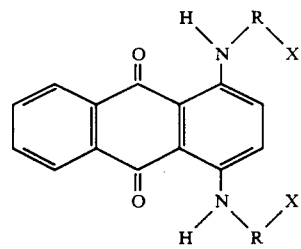

where
X denotes an unsaturated polymerizable organic radical; and
R is an organic diradical with 2 to 12 carbon atoms.

4 Claims, No Drawings

POLYMERIZABLE DYE

CROSS-REFERENCE TO RELATED APPLICATION

This application is a continuation-in-part of U.S. Application Ser. No. 348,543 filed May 2, 1989.

SUMMARY OF THE INVENTION

This invention relates to a class of novel compounds which are useful as comonomers to tint contact lens materials. These compounds are represented by the general formula

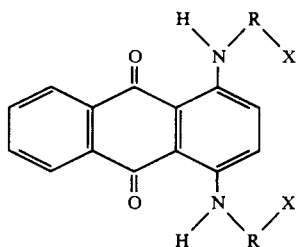

where X denotes a polymerizable, unsaturated organic radical; and R denotes an organic diradical with 2 to 12 carbon atoms. The invention also relates to copolymers of the above compounds which are useful as materials in biomechanical applications.

DETAILED DESCRIPTION OF THE INVENTION

The present invention relates to a novel class of compounds which are particularly useful as comonomers to impart a blue color in biomechanical devices. Specifically, the present invention relates to compounds represented by the foregoing general formula wherein R and X are defined as follows: R is a divalent organic radical with 2 to 12 carbon atoms and X is a polymerizable, unsaturated radical, such as a methacrylate, acrylate, vinyl carbonyl, or vinyl carbamate functional moieties. Compounds wherein R is a divalent phenyl alkyl radical have been found to be especially useful polymerizable dyes.

The general synthetic scheme for producing the comonomers of the present invention is illustrated below.

General Synthetic Scheme

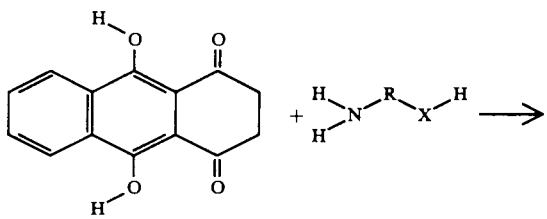

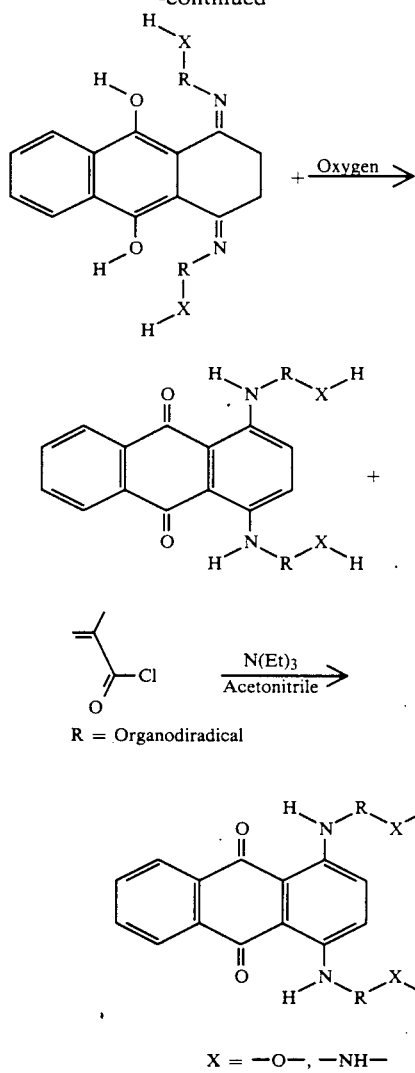

$R = $ Organodiradical $X = -O-, -NH-$

The comonomers produced by the General Synthetic Scheme outlined above have several characteristics which distinguish them over dye comonomers used in biomechanical devices previously. For instance, the present invention dye monomers are compatible with many monomers used to produce biomechanical materials. This allows the dye to be mixed with the bulk monomer prior to the polymerization of that comonomer.

Furthermore, the functionality of the present dye comonomers allows them to be more completely polymerized with the bulk monomers used to produce state of the art biomechanical materials. This ensures that the present invention dye comonomers become integral parts of the copolymer's matrix and cannot be leached out of that matrix by conditions (e.g., physiological conditions) that are encountered by hydrogel materials, especially biomechanical materials such as contact lenses.

Furthermore, due to the solution compatibility of these dye comonomers with other comonomers, they can be used in various concentration ranges which allows them to be used as tinting (or coloring) agents. This result is a particularly important characteristic in contact lens materials and has heretofore been unavailable in the art.

The comonomer dyes of the present invention can be used to produce biomechanical materials in conjunction with known monomers while maintaining all of the advantageous characteristics of polymers produced from the known monomers. This allows for the production of copolymers which are tinted or colored and which still maintain the beneficial physiological characteristics required for biomechanical materials.

The monomers which the present invention can be copolymerized with include both hydrophilic and hydrophobic monomers. Biomechanical materials, of course, include copolymeric mixtures. The compounds of the present invention are used as an additional agent in the prepolymer mixtures disclosed in the art. The dye compound of this invention is added in amounts sufficient to impart the desired color intensity. The upper limit of comonomer dye concentration may be restricted by the amount of crosslinking effected by the difunctional dye molecule. Typically the dye concentration will not exceed 5% of the total monomer mixture. More typically the dye concentration will range from about 0.001 to about 2 weight percent of the total monomer mixture. The concentration will of course determine the color intensity of the resulting copolymer.

The polymerizable dye of this invention is particularly useful to color hydrogel materials. Hydrogel materials (i.e., water-containing polymers) are prepared from a wide variety of copolymeric mixtures characterized by the presence of hydrophilic monomers. Examples of hydrophilic monomers are 2-hydroxyethylmethacrylate, N-vinyl pyrrolidone, and methacrylic acid. Copolymeric mixtures used to prepare hydrogels may also include polymers such as polyvinyl alcohol and polyethylene glycol. Hydrogels for contact lenses are generally made by the polymerization of hydrophilic monomers (e.g., 2-hydroxyethylmethacrylate or N-vinyl pyrrolidone) with a crosslinking agent. Useful hydrogels are also obtained by the copolymerization and crosslinking of hydrophilic and hydrophobic monomers to obtain the desired level of water absorption in the gel. Suitable hydrogels are further exemplified by the materials described in U.S. Pat. No. Re. 27,401; U.S. Pat. No. 3,532,679; and U.S. Pat. No. 3,937,680.

The monomers of the present invention can also be used in conjunction with rigid gas permeable contact lens formulations known in the art as exemplified in U.S. Pat. Nos. Re. 31,406, U.S. Pat. No. 4,424,328, U.S. Pat. No. 4,139,548, U.S. Pat. No. 4,433,111, U.S. Pat. No. 4,152,508, U.S. Pat. No. 4,450,264, U.S. Pat. No. 4,153,641, U.S. Pat. No. 4,540,761, U.S. Pat. No. 4,372,203, and U.S. Pat. No. 3,950,315.

The invention compounds may also be used as comonomers with silicone based systems. Silicones are also well known in the art and are exemplified by the following U.S. Pat. Nos.: U.S. Pat. No. 4,136,250, U.S. Pat. No. 3,518,324, and U.S. Pat. No. 4,138,382.

The following examples are not intended to exemplify the full scope of the present invention. They are meant to illustrate certain specific examples of the present invention to those skilled in the art and to provide sufficient basis for those skilled in the art to practice their invention.

EXAMPLES

EXAMPLE 1a

Synthesis of
1,4-Bis(2-methacrylamidoethylamino)anthraquinone(I)

Into a 250 ml 2 neck round bottom flask equipped with a thermometer was placed 6.0 g of leucoquinizarin and a stir bar, and the flask was flushed with nitrogen. To this was added 75 ml of ethylene diamine through which nitrogene had been bubbled of 15 minutes. While keeping the reactants under nitrogen, the solution was heated to 50° C. for one hour during which the solution turned green. The nitrogen blanket was then removed and air was bubbled through the solution for one hour, keeping the temperature at 50° C., causing the solution to turn blue. Water, 250 ml, was added and the intermediate product was isolated by filtration, washed with water and air dried. The intermediate was recrystallized from acetonitrile. The final isolated yield was 37%. A solution of 1.0 g of the intermediate in 250 ml of methanol was cooled to <3° C. using an ice bath. To this was added 5.0 ml of triethylamine and 3.5 ml of methacryloyl chloride. After one hour the reaction was complete. The product was precipitated by the addition of 500 ml of water, isolated by filtration, washed with 1:1 methanol:water and then water, and air dried giving an isolated yield of 80%.

According to the above procedure, the following compounds were prepared:
1,4-bis(2-acrylamidoethylamino)anthraquinone.
1,4-bis(3-methacrylamidopropylamino)anthraquinone (II),
1,4-bis(3-methacrylamido-2,2-dimethylproylamino) anthraquinone (III),
1,4-bis(2-acrylamidocyclohexylamino)anthraquinone, and 1.4-bis(2-methacrylamidocyclohexylamino)anthraquinone (IV).

EXAMPLE 1b

Synthesis of
1,4-Bis(3-methacryloxypropylamino)anthraquinone(V)

The intermediate was prepared as before using 8.0 g of leucoquinizarin and 50 ml of 3-aminopropanol giving a recrystallized yield of 23%. To a solution of 1.0 g of the intermediate in 200 ml of acetonitrile was added 3.0 ml of triethylamine and 1.5 ml of methacryloyl chloride at room temperature. The reaction was complete after ½ hour. The solution was diluted to 1 liter with water and 1.0 g of NaOH was added. The gummy solids were isolated on fluted filter paper, redissolved in 200 ml of acetone and reprecipitated by the addition of 200 ml of water. The product was isolated by filtration on a fritted filter, washed with 1:1 acetone:water, water and air dried. The isolated yield was 20%.

EXAMPLE 1c

Synthesis of
1,4-Bis(1-methacryloxy-2-butylamino)anthraquinone(VI)

A mixture of 15 g of quinizarin, 75 ml of (±)-2-amino-1-butanol and 100 ml of water was heated under nitrogen at 90° C. for 7.5 hours and then diluted to 500 ml to precipitate the product. The intermediate was isolated by filtration, washed with water and air dried. Recrystallization from toluene gave a yield of 52%. To a solution of 2 g of the intermediate in 100 ml of dry acetonitrile was added 4.0 ml of triethylamine and 3.0 ml of methacryloyl chloride. After ½ hour, 300 ml of ethylene glycol was added and 10 minutes later the solution was diluted to 1 liter with water. The tacky product was filtered out of the solution, redissolved in 200 ml of acetone and precipitated by the addition of 500 ml of water. The wet product was redissolved in 200 ml of acetone a second time and precipitated by the addition of 300 ml of water, isolated by filtration, washed with water and air dried. The isolated yield was 52%. The TLC showed the expected two spots for both the intermediate and the final product.

EXAMPLE 1d

Synthesis of 1,4-Bis(1-methacryloxy-2-pentylamino)anthraquinone(VII)

A deoxygenated solution of 3.0 g of leucoquinizarin, 10.0 g of (±)-2-amino-1-pentanol and 50 ml of triethylamine was heated at 60° C. under nitrogen overnight. Air was then bubbled through the solution at 55° C. for 3 hours. The resulting oil was diluted with 250 ml of methanol and then with 250 ml of water to precipitate the intermediate, which was isolated by filtration, washed with 2:1 water:methanol and the water, and air dried. The isolated yield was 75%. To a solution of 2.0 g of the intermediate in 50 ml of dry acetonitrile was added 4.0 ml of triethylamine and 2.0 ml of methacryloyl chloride. After 30 minutes at room temperature, the reaction was completed. The solution was diluted with 50 ml of ethylene glycol followed by 400 ml of water 15 minutes later. After vigorous stirring for one hour, most of the gummy product was sticking to the sides of the flask. The solution was filtered and the solids were dissolved in 500 ml of methanol. The product was reprecipitated by the addition of 500 ml of water, isolated by filtration, washed with 1:1 water:methanol followed by water and air dried. Isolated yield was 34%.

EXAMPLE 1e

Synthesis of 1,4-Bis(4-methacryloxycyclohexylamino)anthraquinone(VIII)

A deoxygenated solution of 10.0 g of trans-4-aminocyclohexanol hydrochloride, 2.76 g of NaOH, 25 ml of water and 45 ml of triethylamine was added to a nitrogen filled flask containing 2.0 g of leucoquinizarin and the mixture was heated at 55° C. for two hours. Air was then bubbled through the solution overnight at 55° C. to form the crude intermediate. The slurry was diluted to 250 ml with water and the solids were isolated by filtration. Unoxidized product was removed by placing the solids in 500 ml of boiling 2-propanol for one hour, cooling and filtering. The purified intermediate was washed with methanol and air dried. The isolated yield was 61%. To a slurry of 1.5 g of the intermediate in 100 ml of toluene was added 5.0 ml of pyridine and 1.4 ml of methacyloyl chloride. After boiling for 10 minutes, the product was formed and the solvent was removed on a rotovap. The solids were dissolved in 500 ml of acetone and the product was precipitated by the addition of 500 ml of water. The fine precipitate was isolated on fluted filter paper, redissolved in acetone, precipitated with water and the product was isolated by filtration. After washing with water, the product was air dried. The yield was 60%.

EXAMPLE 1f

Synthesis of 1,4-Bis(2-methacryloxycyclohexylamino)anthraquinone(IX)

A deoxygenated solution of 10.9 g of 2-aminocyclohexanol hydrochloride, 2.58 g of NaOH, 50 ml of water and 100 ml of triethylamine was added to a nitrogen filled flask containing 2.0 g of leucoquinizarin and the mixture was heated at 55° C. for four hours. Air was then bubbled through the solution overnight with the temperature reaching 80° C. After diluting with water, the solids were filtered out. The solids were slurried and washed with acetone until the filtrate was light blue. The yield of the air dried product was 42%. Over a ½ hour period of time, a total of 2.6 ml of methacryloyl chloride, 4.0 ml of triethylamine and 2.0 ml of pyridine was added to a slurry of 1.0 g of the intermediate in 100 ml of dry acetonitrile. Product was formed by boiling the mixture for one hour. Water, 25 ml, was added and the solvents were rotovaped off. The solids were slurried in 1 liter of water containing 0.5 g of NaOH for ½ hour and the product was isolated from the highly colored solution by filtration. The product was dissolved in 300 ml of acetone, precipitated by the addition of 600 ml of water and isolated by filtration several times until the filtrated was light blue. The yield of the air dried product was 20%.

EXAMPLE 1g

Synthesis of 1,4-Bis(2-methacryloxy-1-phenylethylamino)-anthraquinone(X)

In an oxygen free solution, 3.0 g of leucoquinizarin and 10.0 g of L-2-phenylglycinol in 150 ml of triethylamine were reacted overnight at 55° C. Air was then bubbled through the solution for 3 hours at 55° C. and the mixture was reduced to dryness on a rotovap. The solids were dissolved in acetone and the intermediate was precipitated by the addition water containing NaOH. The product was isolated from the highly colored solution by filtration, washed and air dried. The yield of the intermediate was 45%. Two grams of the intermediate was dissolved in 100 ml of dry acetonitrile to which was added 4.0 ml of triethylamine and 2.5 ml of methacyoyl chloride. After ½ hour the reaction was complete. Methanol, 25 ml, was added and the solvents were rotovaped off. The product was dissolved in 250 ml of water and isolated by filtration several times until the filtrate was light blue. The yield of the air dried product was 33%.

EXAMPLE 1h

Synthesis of 1,4-Bis(1-methacryloxy-3-methyl-2-pentylamino) anthraquinone(XI)

A 1.5 g sample of leucoquinizarin was reacted with 5.0 g of L-isoleucinol in 50 ml of triethylamine under nitrogen for 6 hours at 55° C. Air was then bubbled through the solution for 8 hours with the temperature reaching 80° C. at one point. The mixture was diluted with 1:1 methanol:water and filtered to isolate the intermediate. The intermediate was washed with the same solvent mixture until the filtrate was light blue. The yield of the air dried intermediate was 87%. TLC showed that the intermediate still contained unoxidized and mono-substituted impurities. To a solution of 1.23 g of the impure intermediate in 50 ml of dry acetonitrile was added 3.0 ml of triethylamine and 1.5 ml of methacyloyl chloride. The reaction was complete after 15 minutes at room temperature. Methanol, 50 ml, was added and the solution was evaporated to dryness. The crude product was purified by column chromatography over silica gel using 1:1 toluene:chloroform as the eluent. When the solvent was evaporated, it was found that the product was tacky. Repeated dissolving in methanol and stripping resulted in a dry product. The yield was 63%.

EXAMPLE 1i

Synthesis of 1,4-Bis(4-(2-methacryloxyethyl)

phenyamino-anthraquinone (XII)

A 3.0 g sample of leuquinizarin was heated with 10.0 g of 4-aminophenethyl alcohol (mp 113° C.) under nitrogen at reflux (~150° C.) for 5 hours. TLC showed no further changes occurring. Ethylene glycol, 25 ml, was added and air was bubbled through the hot solution for 3 hours. After cooling, the resulting solid cake was broken up and the solids were dissolved in 1 liter of acetone, the solution filtered and the intermediate was precipitated by the addition of 1 liter of NaOH in water. The intermediate was isolated by filtration, washed with water and air dried. The yield was 38%. To a slurry of 1.6 g of the intermediate in 30 ml of dry acetonitrile was added 3.2 ml of triethylamine and 1.6 ml of methacrylol chloride at room temperature. After 30 minutes the reaction was complete and 15 ml of ethylene glycol was added. After 15 minutes, the product was precipitated by diluting the solution to 1 liter with water and isolated by filtration. The product was purified by dissolving 800 ml of acetone and precipitated by the addition of 400 ml of water. The product was isolated from the deep rust colored solution by filtration, washed with 1:1 acetone:water and air dried. The isolated yield was 57%.

EXAMPLE 2

Preparation of Tinted Copolymeric Contact Lens Materials

A monomer mix was prepared from the following formulation:
2-hydroxymethacrylate (HEMA): 99.49 wt %
Ethylene Glycol Dimethacrylate (EGDMA): 0.34 wt %
Benzo Methyl Ether Catalyst (NVP): 0.17 wt %
monomer I: 200 ppm Monomer (I) is the dye molecule synthesized in Example 1(a). The monomer mixture was polymerized between silicone treated glass plates using a fluorescent UV source. Similar pHEMA films were cast using 200 ppm of the various monomers synthesized in Example 1.

EXAMPLE 3

Discs were cut from the film prepared from monomer I (as described in Example 2). These untinted discs were tinted by a state of the art method using Procian blue (Procian Blue discs). The visible spectra of the film discs of example 2 and the Procian Blue discs were compared. The discs were then subjected to accelerated hydrolysis testing and the resultant visible spectra were again compared. Both types of discs showed about the same loss of color intensity. However, the loss of the color intensity in the Procian disc was from loss of dye from the disc whereas loss of color intensity in the monomer I disc was due to the hydrolysis of the amine functionality rather than actual monomer loss.

EXAMPLE 4 pHEMA films were made with 200 ppm of each of the monomers I, II, III, and IV. Incorporation of the bismethacrylamide monomers into the pHEMA was tested with the following results:

| Monomer | Bridge (R) | % Incorporation |
| --- | --- | --- |
| I | —(CH$_2$)$_2$— | 92 |
| II | —(CH$_2$)$_3$— | 90 |
| III | —CH$_2$C(CH$_3$)$_2$—CH$_2$— | 82 |
| IV | 1,2-cyclohexylene | 82 |

The hydrolytic stability of the final polymeric material was tested by boiling the samples in buffered saline solution. After 4 weeks the loss of color intensity was as follows:

| Monomer | % Loss at 600 nm | at 640 nm |
| --- | --- | --- |
| I | 18 | 26 |
| II | 16 | 28 |
| III | 14 | 26 |
| IV | 5 | 7 |

The monomer with the largest R radical produced the most stable copolymeric material.

EXAMPLE 5

The dimethyacrylate ester monomers were tested for incorporation in to a pHEMA material and for stability. Incorporation was as follows:

| Monomer | Bridge (R) Precursor | % Incorporation |
| --- | --- | --- |
| V | 3-aminopropanol | 100 |
| VI | 2-aminobutanol | 98 |
| VII | 2-aminopentanol | 98 |
| VIII | 4-aminocyclohexanol | 98 |
| IX | 2-aminocyclohexanol | 95 |
| X | 2-amino-2-phenylethanol | 97 |
| XI | 2-amino-3-methylpentanol | 97 |
| XII | 2-(4-aminophenyl)ethanol | 99 |

The hydrolytic stability of the pHEMA films were tested as described in Example 4. After 4 weeks, the loss of color intensity was as follows:

| Monomer | % of Loss at 600 nm | at 640 nm |
| --- | --- | --- |
| V | 49 | 53 |
| VI | 14 | 27 |
| VII | 16 | 28 |
| VIII | 25 | 38 |
| IX (3 weeks) | 11 | 25 |
| X | 15 | 24 |
| XI | 14 | 29 |
| XII | 6 | 6 |

EXAMPLE 6

Films were cast from a monomer mix as described in Example 2 except that the mix contained 150 ppm of monomer XII. The control was untinted film cast from the same lot of monomer mix. Film properties were measured with the following results:

| Test | Monomer XII Film | Control Film |
| --- | --- | --- |
| modulus (g/mm$^2$) | 57 | 59 |
| tensile | 66 | 71 |
| % elongation | 280 | 290 |
| initial teat | 6.8 | 6.7 |
| propagation tear | 4.9 | 5.0 |
| % H$_2$O | 37.3 | 37.9 |
| O$_2$ permeability (cm$^3$ × cm/sec × cm$^2$ × @ 35 C.) | 8.9 × 10$^{-11}$ | 9.2 × 10$^{-11}$ |

The results show that the monomer does not affect the physical characteristics of standard contact lens materials.

EXAMPLE 7

A monomer mix was prepared from the following formulation:
Methyl methacrylate: 36.4 grams
NVP: 88.2 grams
EGDMA: 0.033 grams
Allyl methacrylate: 0.24 grams
VAZO-64 Catalyst: 0.12 grams
Monomer XII: 450 ppm The monomer mix was heat cured into rods from which buttoms were cut and discs were lathed. The buttons and discs were blue-green.

What is claimed is:

1. Compounds having the general chemical formula

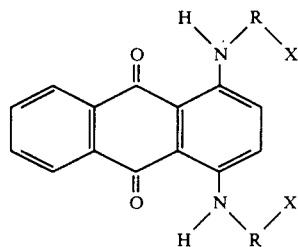

wherein:
R denotes a divalent radical with 1 to 12 carbon atoms; and
X denotes a polymerizable unsaturated organic radical.

2. The compound of claim 1 wherein X is described by the formula —Y—CO—C(Z)=CH$_2$ wherein Y is —O— or —NH— and Z is hydrogen or methyl.

3. The compound of claim 2 wherein R is a divalent phenylalkyl radical.

4. The compound 1,4-bis(4-(2-methacryloxyethyl) phenylamino)anthraquinone.

* * * * *